Feb. 7, 1939.　　　　F. E. FLADER　　　　2,146,538
ADJUSTABLE ENGINE COWLING
Filed June 18, 1937　　　2 Sheets-Sheet 1
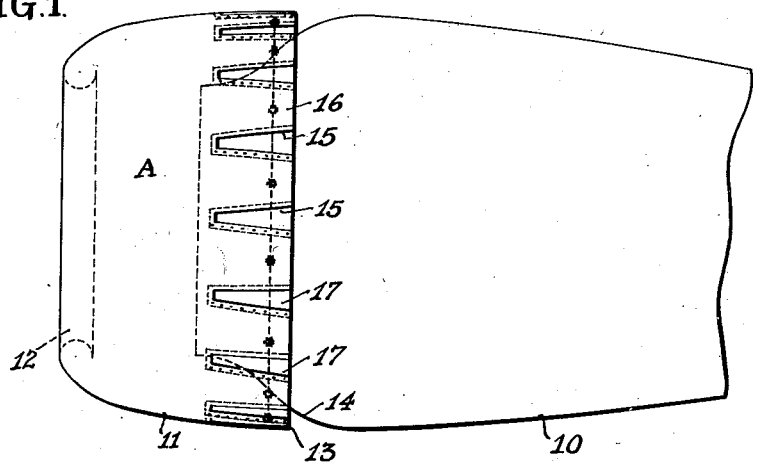
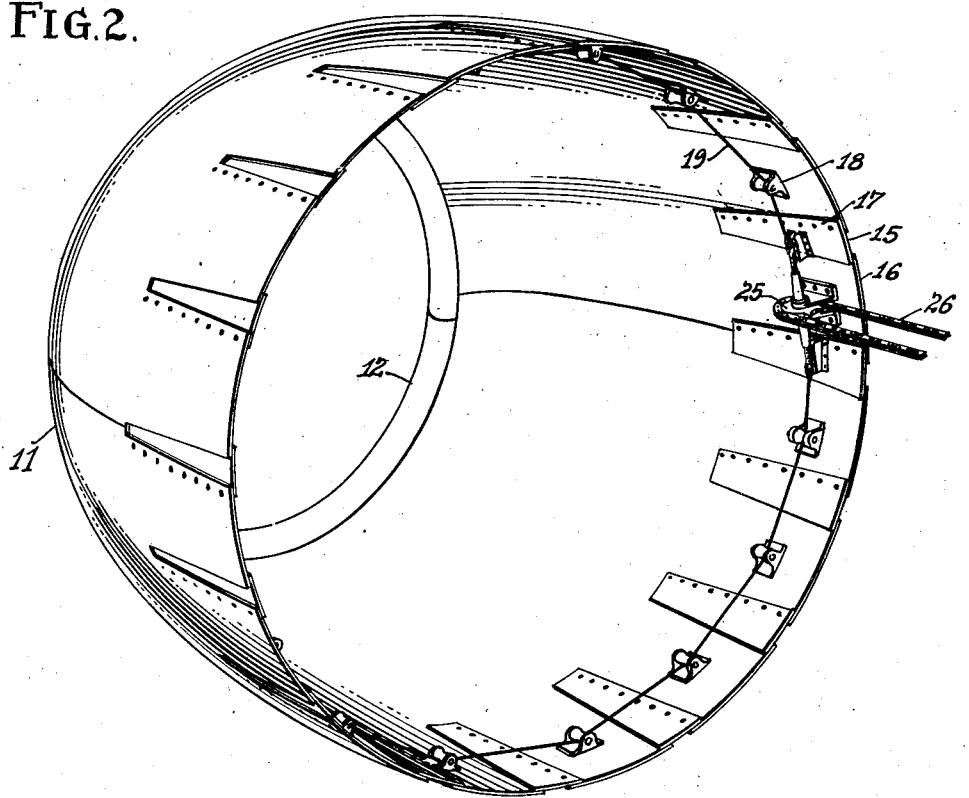
INVENTOR.
FREDRIC E. FLADER.
BY
ATTORNEYS.

Feb. 7, 1939. F. E. FLADER 2,146,538
ADJUSTABLE ENGINE COWLING
Filed June 18, 1937 2 Sheets-Sheet 2
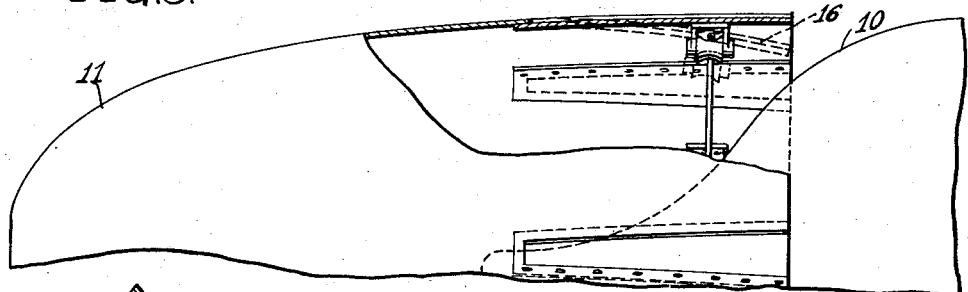
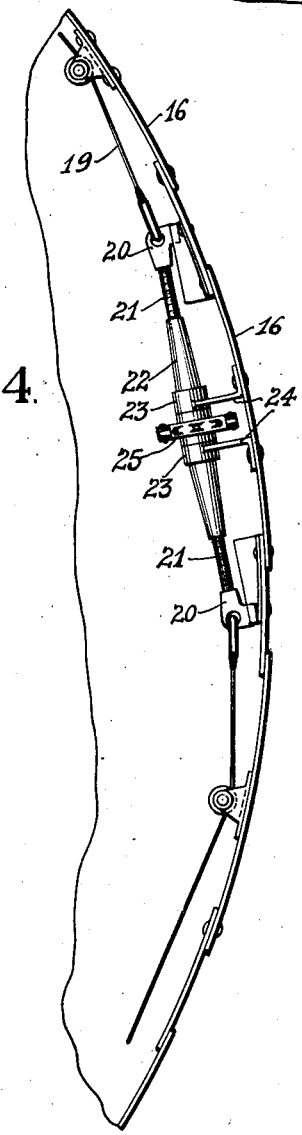
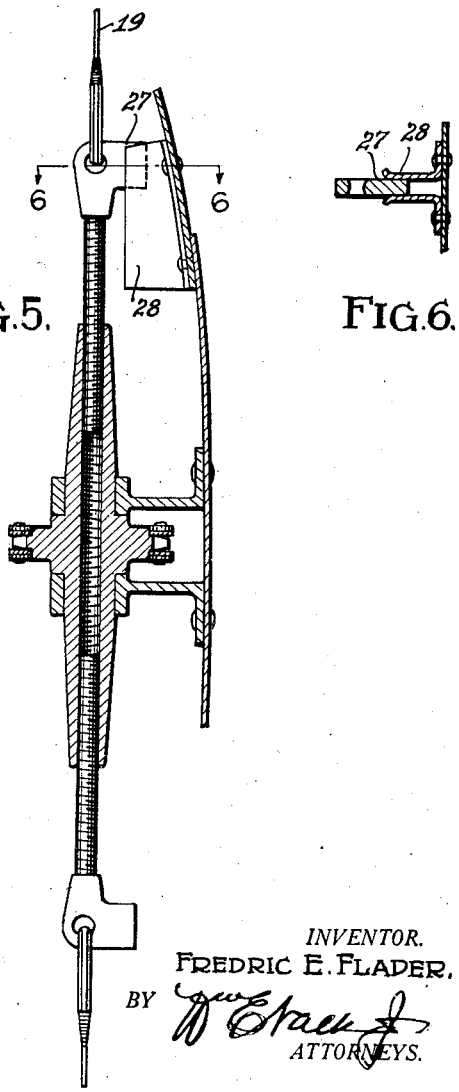
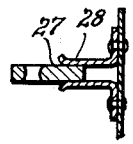
INVENTOR.
FREDRIC E. FLADER.
BY
ATTORNEYS.

Patented Feb. 7, 1939

2,146,538

UNITED STATES PATENT OFFICE 2,146,538

ADJUSTABLE ENGINE COWLING

Fredric E. Flader, Kenmore, N. Y., assignor to Curtiss-Wright Corporation, a corporation of Delaware Application June 18, 1937, Serial No. 148,844

6 Claims. (Cl. 123—171)

This invention relates to aircraft engine cowling of the annular type, and provides means for controlling the amount of air flow passing through the cowling.

In current types of aircraft, a radial cylinder engine is mounted at the forward end of a nacelle or body and an annular streamlined cowl embraces the engine, the cowl being provided at its leading edge with an air entrance opening, the trailing edge of the cowl being separated from the nacelle or body to provide therewith an air exit opening. Various methods have been proposed in the art for controlling the amount of air flow through the cowling in order to alter the cooling effect of the cooling air upon the embraced engine.

This invention has for an object the provision of a simple means for controlling the effective area of the exit air opening between the cowl trailing edge and the nacelle.

A further object is to provide an extremely simple means for warping or deforming the cowl trailing edge whereby the effective opening defined by said trailing edge may be selectively altered.

Still another object is to so arrange the airflow control mechanism as to maintain, at all times, a smooth exterior form for the annular cowling, whereby a minimum of airflow disturbance is caused.

Further objects and advantages will be apparent from a reading of the subjoined specification and claims, together with an examination of the accompanying drawings, in which similar numbers indicate similar or like parts, and in which:

Fig. 1 is a side elevation of an aircraft body with the cowling of this invention arranged at the forward end thereof;

Fig. 2 is a perspective view from the rear, of the cowling including the adjusting means therefor;

Fig. 3 is a fragmentary side elevation, partly broken away, to show the details of construction;

Fig. 4 is a fragmentary rear view of a portion of the cowling;

Fig. 5 is an enlarged sectional view of the adjusting device for the cowling, and Fig. 6 is a section on the line 6—6 of Fig. 5.

In Fig. 1, 10 represents an aircraft fuselage, body, or nacelle, of conventional form, to the forward end of which an aircraft engine (not shown) is adapted to be mounted, such engine occupying the region indicated at A. An annular cowling 11 embraces the engine, said cowling having a forward axial air entrance opening 12, through which air may pass for cooling of the engine, and the trailing edge 13 of the cowling defines with the body portion 14 an air exit annulus through which air warmed by the engine may pass. The cowling 11 is preferably made of resilient sheet metal, and a plurality of circumferentially spaced cutouts 15 are formed toward the trailing edge thereof to provide a plurality of circumferentially spaced projections 16 which are individually deformable. Gussets 17 are attached to one edge of each projection to cover the cutout 15 between the several projections to avoid loss of air therethrough. To the inner surface of each projection is attached a guide pulley 18, and a cable 19 is threaded circumferentially of the cowling through the several pulleys, the cable being shackled at its ends, as at 20, to screws 21 threaded into a turnbuckle barrel 22, the barrel being carried in bearings 23 mounted upon brackets 24 attached to one of the projections 16. The barrel is likewise provided with a sprocket 25 over which a chain 26 passes, the chain extending rearwardly to a suitable control operable by the aircraft crew. Lips 27, as shown in Figs. 5 and 6, are provided on each screw 21, the lips engaging in guideways 28 attached to the inner face of appropriate parts of the cowling. The elements 27 and 28 serve to prevent turning of the screws 21 with the barrel 22 when the latter is rotated in its bearings 23.

In operation, the barrel 22 may be rotated to extend the screws 21 therefrom, said screws being respectively provided with right hand and left hand threads. When so extended, the cowling projections 16 spring outwardly to provide a relatively large area of air exit opening between the cowl leading edge and the fuselage. If the barrel 22 be turned to draw the screws 21 inwardly toward each other, the cable 19 is placed in tension, and is shortened, whereby all of the projections 16 will be drawn substantially radially inwardly to reduce the area of the air exit opening at the cowl trailing edge. Fig. 3 shows in full lines, the full air exit opening with the projections radially extended, while the figure shows, in dotted lines, the projections 16 drawn inwardly to define, with the body 10, a restricted air exit opening.

The structure above described provided a very simple and inexpensive means for varying the effective amount of air flow passing through the cowling. The inherent movement and vibration of the cowling, along with the air flow therethrough, will cause the several projections 16 to assume concentric positions with respect to the body axis, should the frictional effect of the cable passing through the several guide members 18 initially tend to draw only those projections which are adjacent the turnbuckle at the outset. Similarly, when the turnbuckle is turned to enlarge the air exit opening, the enlargement may be initiated at the turnbuckle, but all of the projections 16 will quickly adjust themselves to a fully open position by virtue of airflow and the slight natural vibration of the cowling.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

I claim as my invention:

1. In an annular aircraft cowling, a plurality of circumferentially arranged edge projections fixed thereon defining therebetween circumferentially spaced cutouts, said projections being resilient and having a normal position wherein their outer surfaces are substantially streamlined continuations of the cowling profile, a guide on the inner surface of each projection, a flexible cable running consecutively through said guides, and means to shorten the effective length of said cable for bending said projections inwardly with respect to the normal cowling profile.

2. In an annular cowling member including an annular trailing edge portion of flexible material having a plurality of circumferentially spaced cutouts in the trailing edge thereof, forming flexible trailing edge projections, a guide on each projection, a cable extending circumferentially of the projections through said guides, and means to shorten the effective circumferential length of said cable for bending said projections inwardly relative to the cowling member.

3. In a flexible annular cowling member, having a plurality of circumferentially spaced cutouts in an edge thereof, forming between said cutouts, bendable edge projections integral with the cowling, gussets on each projection overlapping the next adjacent projection, and means to simultaneously bend all said projections for changing the effective diameter of said edge.

4. In a flexible annular cowling member, having a plurality of circumferentially spaced cutouts in an edge thereof, forming between said cutouts, bendable edge projections integral with the cowling, gussets on each projection overlapping the next adjacent projection, means to simultaneously bend all said projections for changing the effective diameter of said edge, said means comprising a cable engaging said projections for movement with and with respect to each projection, and means to change the effective length of said cable for altering the position of the several projections.

5. An annular cowling member of flexible material having a plurality of circumferential cutouts extending from the cowl edge into the body thereof, forming therebetween integral flexible flap segments, and means to simultaneously bend all said flap segments in the same radial sense to change the effective diameter of the cowl edge.

6. An annular cowling member of flexible material having a plurality of circumferential cutouts extending from the cowl edge into the body thereof, forming therebetween integral flexible flap segments, means to simultaneously bend all said flap segments in the same radial sense to change the effective diameter of the cowl edge and gussets each attached to one said flap segment and overlapping the adjacent cut-out.

FREDRIC E. FLADER.